June 16, 1925.

F. A. ADAMS

WASHING MACHINE

Filed May 27, 1922

Inventor

Frank A. Adams.

By Mason Fenwick & Lawrence,

Attorneys

June 16, 1925. 1,542,650
F. A. ADAMS
WASHING MACHINE
Filed May 27, 1922 5 Sheets-Sheet 2

Inventor
Frank A. Adams.

By Mason Fenwick & Lawrence,
Attorneys.

Patented June 16, 1925.

1,542,650

UNITED STATES PATENT OFFICE.

FRANK A. ADAMS, OF ROCHESTER, NEW YORK, ASSIGNOR TO GEORGE F. MERRELL, INCORPORATED, OF ROCHESTER, NEW YORK, A CORPORATION OF NEW YORK.

WASHING MACHINE.

Application filed May 27, 1922. Serial No. 564,234.

*To all whom it may concern:*

Be it known that I, FRANK A. ADAMS, a citizen of the United States, residing at Rochester, in the county of Monroe and State of New York, have invented certain new and useful Improvements in Washing Machines; and I do hereby declare the following to be a full, clear, and exact description of the invention, such as will enable others skilled in the art to which it appertains to make and use the same.

This invention relates to the art of treating materials with liquid and thereafter removing by centrifugal force the liquid that saturates or clings to the materials as a result of the liquid treatment. It comprises a unitary mechanism particularly intended and adapted for washing clothing or other fabric articles and for thereafter extracting the water from said articles without removing them from the position in which they were washed.

A principal object of the invention is to effect successively the several operations of washing, rinsing, and mechanically removing the moisture from the washed and rinsed articles by manipulation of a single controller. Incidental thereto, it is an object of the invention to utilize the water drawn from an ordinary faucet or tap to actuate the mechanism and perform the several functions, and in general to improve the operation of machines of this character and to facilitate washing and drying fabric articles as specifically described and explained hereinafter.

The invention consists in the general combination and in the sub-combinations and details of construction described hereinafter, illustrated in the accompanying drawings and defined in the appended claims.

In the drawings, in which like reference characters indicate like parts throughout the several views.

In order to exemplify my invention, I have illustrated in the drawings and described hereinafter the best embodiment thereof now known to me, although it will be apparent that various changes in detail may be made without departing from the spirit of the invention.

In the drawings, 1 indicates a main receptacle or outer casing adapted to hold water or other liquid and within which the several operations intended to be carried out upon clothing and other articles are performed. The said receptacle 1 may be a cylindrical tub or tank of sheet metal having oppositely disposed handles 2, by which it may be conveniently lifted, and a removable cover 3. The receptacle 1 may be filled with water to any desired level up to or below the overflow opening 4. Leading downward from the overflow opening 4 is an overflow or down spout 5, preferably formed of a strip or sheet of metal U-shaped or convexed in cross section and having its edges welded or otherwise suitably secured vertically to the side of the tub, the lower open end of said down spout projecting below the bottom 6 of the tub, as indicated at 7 and the upper end being closed. In said bottom 6, at one side of the center, is a drainage outlet 8 of generous capacity adapted to be closed by a valve 9, which may be a conical body of rubber adapted to fit said opening 8; preferably the valve body is riveted or otherwise secured to an arm 10 hinged at its free end adjacent the edge of the receptacle 1. As a preferred form of hinge, a lug 11 is secured to the bottom 6 having the end 12 raised from the bottom and projecting toward the side of the receptacle, the arm 10 having an opening therein adapted to fit over the end 12 of said lug. By this construction, the valve may be readily removed or replaced. On the lower surface of said valve 9 secured by the same rivets that secure the valve body to the arm 10, are parallel depending plates 13 integrally united by the cross plate 13ª and having slots 14 in their lower portions extending substantially parallel with the lower surface of the valve. Beneath the valve 9 is a discharge or drainage trough 15, the side walls 16 of which are secured water tight to the bottom 6 of the receptacle 1 and to the peripheral wall 31 of a motor housing, to be presently described, by soldering, welding or otherwise. Pivoted in the sides 16 of said trough is a crank 18 for opening and closing valve 9. This crank has a handle 19 extending at one side of the trough to a position where it may be readily reached and operated; a crank pin 20 thereon extends through the slot 14 and serves to open or close the valve when the crank is rocked in one direction or the other. Said crank pin 20 is elastic and adapted to yield transversely to pressure. When the crank is rocked so as to bring the crank pin 20 into engagement with the left hand end of the slot 14, as shown particularly in Figure 15, the valve is locked in closed position. Any tendency of the valve to open is resisted because the lines of force exerted by the opening movement of the valve fall to the left of the axis of the crank pin (as viewed in Fig. 15) so that no motion is possible in that direction excepting that which is permitted by the elasticity of the crank pin. When the crank pin is moved to the right hand end of the slot, (as viewed in Figure 15) and the movement continued, the valve is opened to the position shown in dotted lines in Figure 15. In moving the valve to this position the elastic crank pin yields slightly and exerts its tension to hold the valve open. Downward pressure upon the valve cannot close it until the elastic pressure of the crank pin tending to hold it open has been overcome. From the construction thus far described it is apparent that receptacle 1 may be drained rapidly into trough 15 by opening the relatively large valve 9; also that the receptacle can be filled only to the level of the overflow opening 4 and that the overflow from said opening is also discharged into the trough 15.

Rising from the central portion of the bottom 6 is a rigid tube 21 open at both ends. The wall of said tube is fluid tight and forms a portion of the liquid retaining wall of receptacle 1. In the construction shown, its lower end is expanded, the expanded portion engaging the material at the edge of a central hole in said bottom 6 and said expanded portion soldered or welded to the bottom so as to prevent leakage at this point.

Reference character 22 indicates a centrifugal moisture extractor in the form of a perforated basket, the perforations 23 being distributed about the circumferential wall thereof and the outer zone of the bottom 24. The said bottom 24 is preferably composed of a disk like plate depressed as at 25 between its center and outer edge and is preferably circumferentially embossed as at 26 to strengthen it. The bottom 24 has a central opening in which is inserted an annular bearing raceway 27 having a contracted upper end and flanged lower end, the inner periphery of said bottom 24 being connected to the contracted upper portion of said raceway, while to the flanged lower edge is soldered or welded the inner edge of an annular strut or bracing disk 28, the outer edge of which is soldered or otherwise joined to the lower side of the bottom member 24 under the depression 25. Extending upward from the upper end of the raceway 27 is a preferably tubular supporting member 29 spaced from the rigid tube 21 by bearing rollers and by a top connection to be described. Disposed between the inner surface of the raceway 27 and the lower portion of the rigid tube 21 are the bearing rollers 30 mounted in a spacing cage in the usual manner. The said rollers steady the perforated basket 22, keeping it spaced from the fixed tube 21, which serves as the inner bearing raceway, and allow it to rotate easily. Water in the receptacle may, it will be seen, rise freely between the tube 29 and the basket supporting member 21.

Secured to the underside of the bottom of receptacle 1 is a motor housing comprising a circumferential wall 31 having a preferably conical top 32 with a central opening 33, the outer edge 34 of said top being rigidly united to the wall 31 below the upper edge of the latter, and the edge about the hole united to the bottom 6 of the receptacle. Side wall 31 extending above the zone of connection thereto of the outer edge 34 of the top 32 is soldered or otherwise firmly united to the underside of the bottom 6 of receptacle 1 as at 35. There is thus formed between the top 32 of the housing and the bottom 6 of the receptacle an air chamber 36 which, as will later appear, has an insulating function. The wall 31 has openings 37 spaced about its perimeter above its junction with the top member 32 so as to provide for the admission of air into said insulating chamber. The bottom of said housing consists of a casing cover 38 having a central opening and being preferably dished upward and has its outer edge 39 removably connected to the lower edge of wall 31 by bolts 40, a packing gasket 41 being disposed between a flange 42 on the wall 31 and the edge portion 39 of the removable cover member 38. Ports 31$^a$ are formed in that portion of the wall 31 that constitutes the back wall of trough 15, through which the exhaust water from the impact wheel (to be hereinafter described) enclosed in said housing, is discharged to the trough 15.

Within the central opening of the motor housing cover 38 is secured a combined motor support and valve casing 43. Said casing comprises a suitable slide valve housing 44 and pilot housing 44$^a$ not necessary to be described in detail in this application, as they form no part of the invention herein claimed, and may be considered as typical of a conventional-pilot valve-shifted slide valve mechanism. A portion of the casing 43 projects upward substantially at right angles to the housing 44 and comprises a cylindrical terminal member 45, a somewhat larger threaded portion 46 and a flange 47 below the threaded portion. The threaded portion 46 is passed through the central opening in said dished bottom cover 38, the flange 47 compressing between it and the cover member 38 a gasket 48, while a nut 49 engaging the threaded portion 46 clamps the said valve casing securely to said member which thus supports the casing 43 and all attached parts. In the terminal member 45 of the casing is secured a motor housing 50 which incases a reciprocating motor mechanism (not shown) which may be substantially of the kind disclosed in my prior Patent No. 1,406,136. Inasmuch as said motor mechanism of itself forms no part of the invention claimed herein, it is sufficient to state that it comprises a cylinder, piston and a piston rod 51 reciprocatable through the upper end of the housing 50.

The upper end of said housing 50, is reduced as at 52 immediately above a collar 53 having in its upper surface an annular race for bearing balls 54. Surrounding and rotatably mounted with respect to the reduced portion 52 is a bearing cap or member 55 comprising a sleeve and an expanded skirt or enlarged cylindrical portion 56 resting upon the balls 54 and having secured thereto, in any suitable manner, a tubular driving shaft 57 that extends downward within the fixed tube 21, incasing and concentric with the motor housing 50 and spaced therefrom. At its lower end the tubular shaft 57 is expanded, or rigidly united to an expanded member 58 constituting a bearing raceway, between which and the outer surface of the terminal portion 45 of the valve casing 43 is disposed a set of bearing rollers 59. By said bearing rollers 59 the lower end of the rotary tubular shaft 57 is evenly spaced from the motor casing 50,—the upper ball bearing serving as a thrust bearing to sustain said tubular shaft and position its upper end. By reason of the described bearings, the tubular driving shaft 57 may be rotated with minimum friction. A water motor, preferably a water wheel of impact type, is secured rigidly to the expanded lower portion of said bearing race member 58, the said water wheel comprising a disk 60 carrying at its perimeter a series of cup-like vanes or buckets 61 adapted to respond to the impact of a jet of liquid projected against the concave faces thereof.

Figures 2, 16:
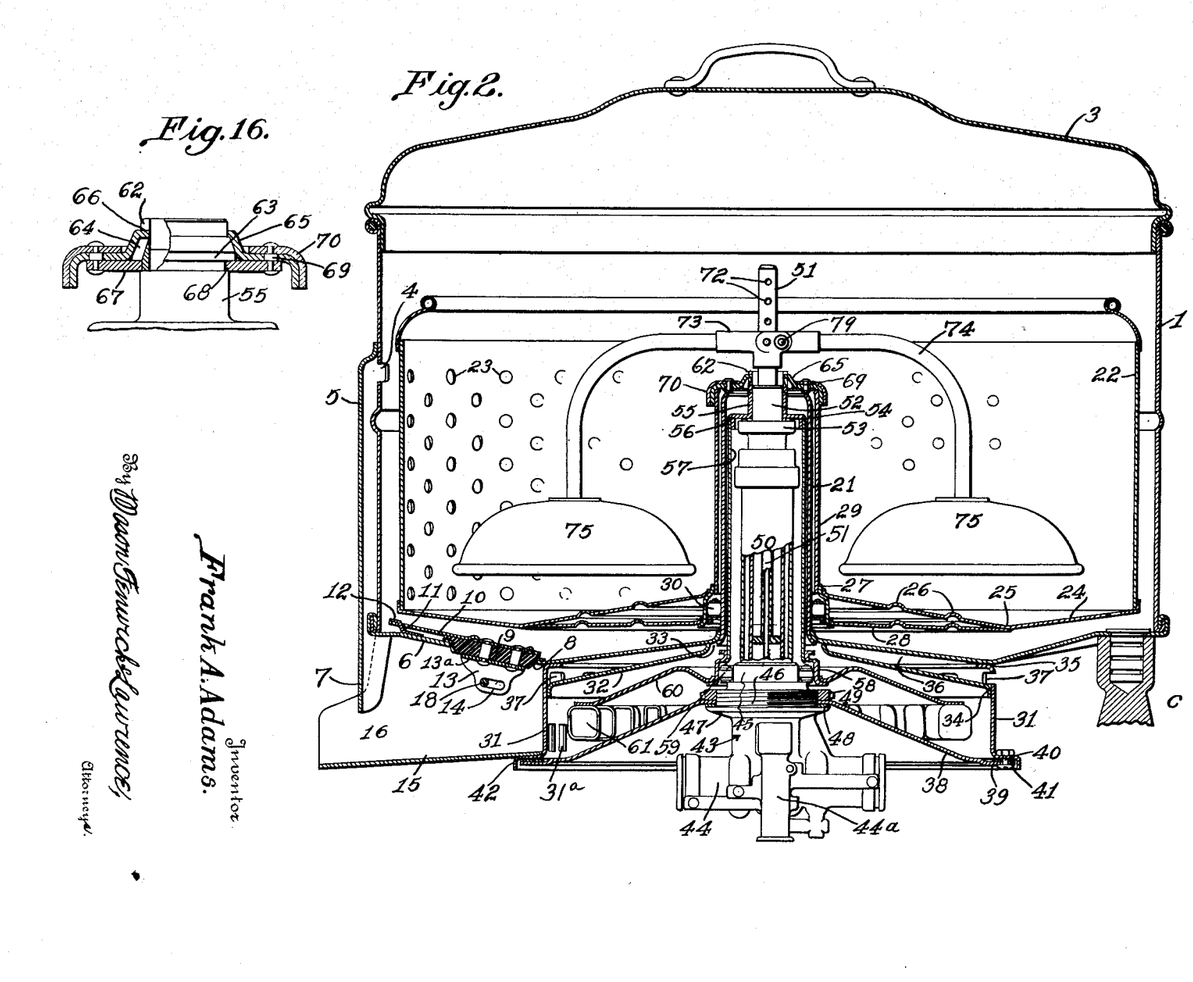
Figure 2 is a vertical cross section of the machine illustrated in Figure 1.
Figure 16 is a partly sectional detail view of a means for detachably connecting a rotary perforated basket to the member by which it is rotated.

Rotation imparted to the inner tube 57 by the water motor is transmitted to the basket 22 by means of a detachable driving coupling now to be described. The upper end of the sleeve of the member 55, which is affixed to the upper end of the tube 57, is provided with vertically-extending, diametrically opposite notches 62. Somewhat below the top of the sleeve is a circumferential collar 63, the under side of which provides a shoulder for a purpose that will presently appear. The collar is divided into two parts by the said notches and is preferably beveled on its upper edge, as indicated by numeral 64 in Fig. 16.

A cap 65, which is affixed to the outer tube 29 to which the basket 22 is affixed, is locked for rotation to the sleeve of said member 55 by means of the lugs 66 which enter the notches 62 in said sleeve. By reason of the construction thus far described the basket 22 is free to be lifted out of the receptacle 1 and disengaged from the driving tube 57 by merely disengaging the cap 65 from the sleeve of the cap member 55.

Means are provided for locking the basket 22 on the driving tube. A plate 67 provided with inwardly directed lugs 68 is disposed over the said sleeve below the shoulder of the collar 63, it being understood that the notches 62 which extend through the collar 63 form gates or openings through which the lugs pass to position below the shoulder. When the plate is turned to move its lugs 68 away from the notches 62, plate can of course not be removed from the sleeve.

The locking plate 67 is connected to the cap 65 by means of headed pins 69 which pass through arcuate slots 69ª in the cap 65. In order to prevent the pins from dropping through the plate 67, in case the heads of the pins should come off, they may be enlarged above said plate or, in other words, in said slot 69ª in which they move. It is now obvious that the plate 67 may be turned relatively to the cap 65 to hold the latter in place on the sleeve. The locking plate 67 is turned by means of a cup-like handle 70 which is connected to said plate by means of the pins 69 which are extended for that purpose.

By means of the detachable locking device described, it will be apparent that the basket may be quickly detached from its connection with the rotary driving tube 57 and as quickly replaced, providing all obstruction above is removed, and that when locked it can have no movement with respect to said tubular driving shaft 57.

The vertical reciprocating rod 51 has a number of small holes 72, vertically spaced from each other for the purpose of adjustably securing thereon an agitating device comprising a cup supporting beam or cross coupling 73 to which are connected cup arms 74, each of which extends transversely from the coupling, then downward and terminates in a cup shaped member 75 of the usual form commonly designated as a vacuum cup. The said arms 74 may be secured to the cup beam or coupling 73 by inserting the ends of the arms into openings extending toward each other from opposite ends of the coupling, while the center of said coupling is provided with an opening extending cross wise therethrough, adapting said beam to be fitted over the reciprocating rod 51. As indicated clearly in Fig. 18, the wall of the vertical opening through the cup beam is flattened on one side and the reciprocating rod 51 is correspondingly flattened so that the agitating device when attached to said reciprocating rod cannot rotate with respect thereto. In order to quickly attach and detach the agitator, the vertical transverse opening of said coupling is intersected by a small hole corresponding in size and adapted to register with any of the holes 72 in reciprocating rod 51. At one side of said transverse opening in coupling 73 is a second small hole parallel with the small hole that intersects the large transverse opening. Slidably mounted in these two parallel small holes is a U shaped locking device 76, one arm 77 of which is adapted to serve as a locking pin and the other arm 78 as an operating means therefor. The two arms of the U shaped locking pin are of unequal length, the longer one having a head 79 adapted to prevent removal of the pin and to limit its unlocking movement so that the end of the locking arm 77 cannot be fully withdrawn from its opening in the cup beam or coupling after it has passed beyond the wall of the large transverse opening for receiving the rod 51. Pressure of the thumb on the head 79 of said U shaped locking pin releases the agitator from the reciprocating member 51 and pressure of the finger on the connecting member at the other side of the coupling secures the agitator to said member when the holes in coupling 73 and rod 51 are registered.

From the mechanism thus far described, it will be apparent that the basket 22 is susceptible of being rotated within the receptacle 1 and that the agitator is susceptible of being reciprocated up and down within the basket. It is also apparent that the agitator may be instantly removed and that after the agitator has been removed, the basket may be detached from its driving member and removed from the receptacle with its contents. The combined operation of the agitator and basket effects the washing and rinsing operation, and the rapid rotation of the basket the moisture removing operation.

As the water utilized to rotate the impact wheel is cold water drawn usually from the city mains, the insulating chamber 36 prevents transfer of heat between the cold water in the water wheel housing and the hot wash-water in the tub or receptacle 1 and prevents chilling of the hot water in the receptacle during the washing operation.

Figures 9, 10, 11, 12, 13, 14, 15:
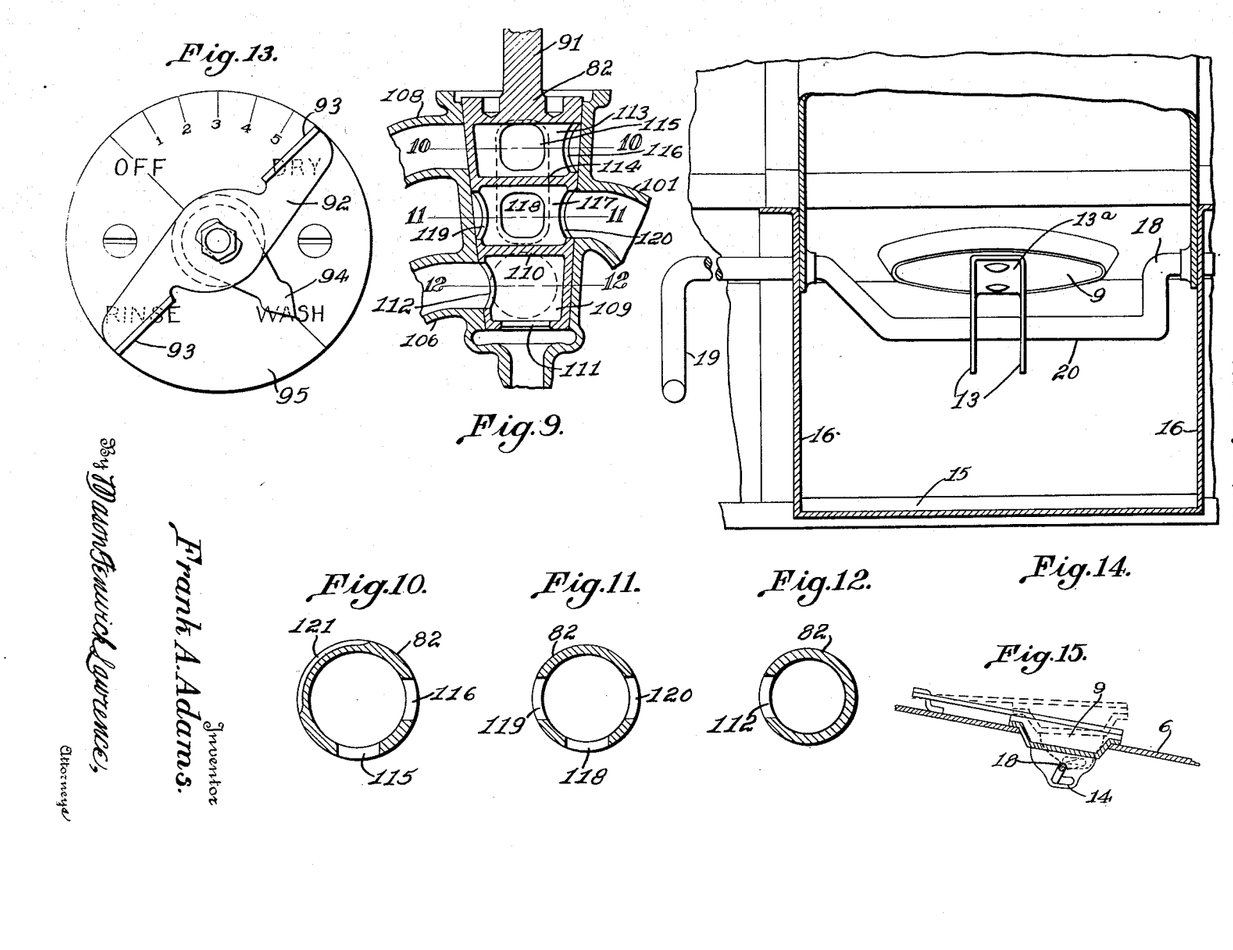
Figure 9 is a horizontal sectional view of the valve casing shown in Figure 5 turned over, with a valve in place therein.
Figures 10, 11 and 12 are cross sections through the valve illustrated in Figure 9 on lines 10, 11 and 12 respectively.
Figure 13 is a face view of a dial associated with a valve operating handle and pointer functioning as a controller for the operative mechanisms.
Figure 14 is a vertical section through the lower end of a discharge trough and overflow spout showing a drain valve and actuating means in a position at right angles to that from which the same parts are viewed in Figure 2.
Figure 15 is a section, of a diagrammatic character, illustrating the locking action of a valve actuating handle on the valve shown in Figure 14.

There remain to be described the means for controlling the operation of the aforesaid movable instrumentalities and for controlling the admission of rinsing water to the receptacle during the rinsing operation, which follows the usual washing operation and precedes the extraction of water from the rinsed articles. The several mechanisms and operations are controlled from a single controlling device, which comprises a dial suitably indexed, as illustrated in Fig. 13, and a handle to which is attached a pointer moving therewith to any of the several positions marked on the dial. In Fig. 13 the pointer is shown directed toward the word "Wash". In this position, the agitator is operated within the slowly rotating basket to wash the articles contained in the basket. When the pointer is moved to indicate the word "Rinse", (prior to which, of course, the receptacle should be drained of the soiled wash water,) clean water is caused to flow into the receptacle and the agitator continues to work within the slowly rotating basket. When said pointer is moved to the point marked "Off" all motion stops. When moved to indicate the word "Dry", the perforated basket commences to rotate at high speed to force the retained moisture from the clothing or other articles that have been washed and rinsed.

Figures 3, 17:
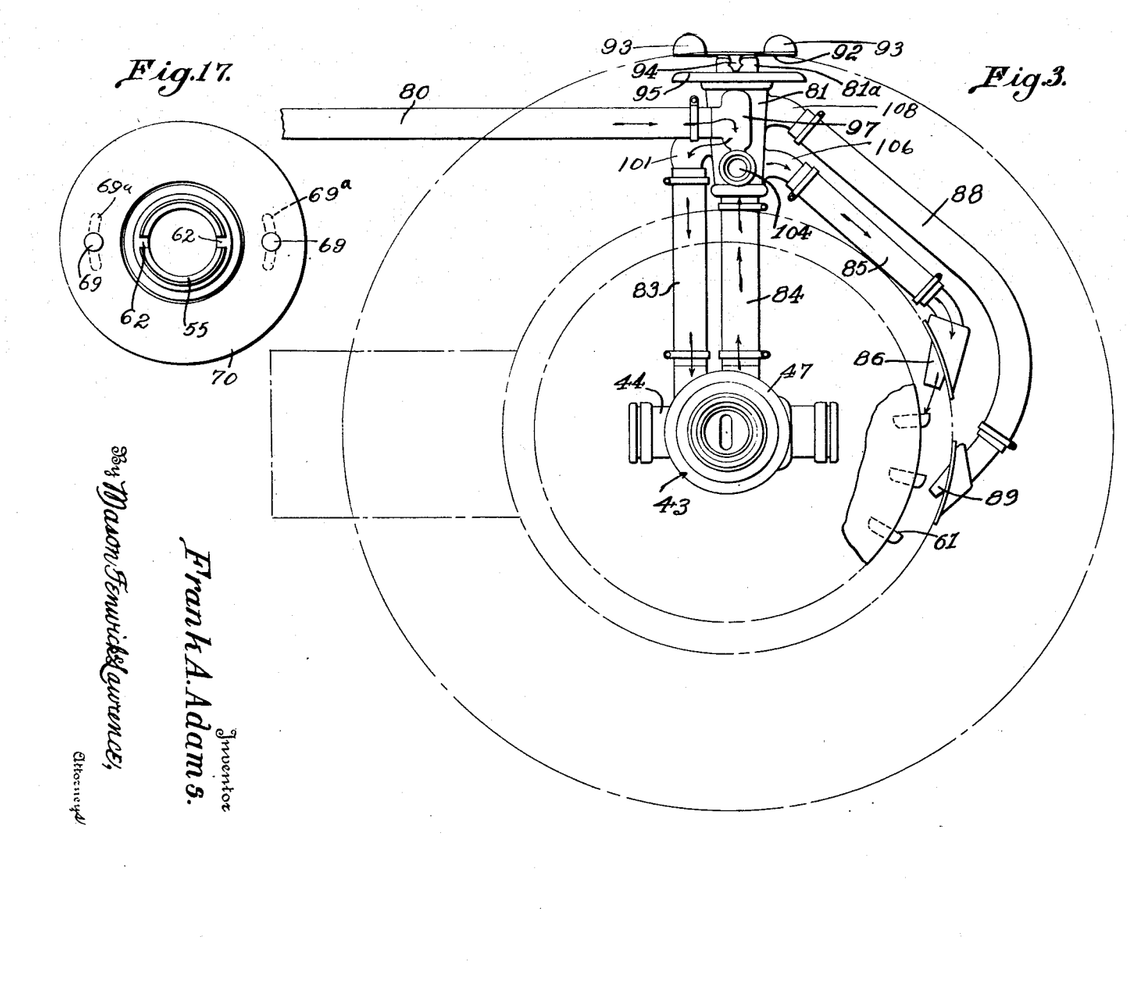
Figure 3 is a diagrammatic view illustrating the means for energizing and controlling the operation of the mechanism.
Figure 17 is a plan view of the parts shown in Figure 16.

The mechanism described and depicted in the drawings is designed to be operated by water flowing from a faucet or tap furnished by the ordinary city water supply. In Figure 3, 80 indicates a hose pipe or other conduit from a faucet to a valve casing 81 within which operates a valve body 82 by means of which water flowing from the tap or faucet through the pipe 80 is distributed to perform the several operations in desired sequence. Water entering the casing by pipe 80 issues therefrom into a pipe or conduit 83, thence enters the valve casing 43, actuates the agitator operating motor within the housing 50, the exhaust from which flows back to the valve casing 81 through the hose or other conduit 84, and when the controlling valve is in "wash" position the water flows by conduit 85 to low speed nozzle 86 which projects it against the buckets 61 of the impact water wheel, thus causing the agitator to operate for the purpose of washing the clothes and simultaneously rotating the basket 22 at a relatively low rate of speed. When the controlling valve is moved to the "Rinse" position, the incoming water flows as before through conduits 80 and 83 to valve casing 43, the exhaust water returning through conduit 84 into casing 81 and thence, instead of passing through conduit 85 to rotate the impact wheel, the water passes through a pipe 87 into the receptacle 1—thus supplying water for rinsing the previously washed clothing and also serving as a means for initially filling the receptacle with water if desired. When the controller is in the position last mentioned, (for rinsing purposes) a portion of the water entering the valve casing 81 through conduit 80 is shunted to hose or conduit 88 which conducts it to high speed nozzle 89 from which it is projected against the buckets 61 of the impact water wheel. The motion of the water wheel at this time is, however, slow because of the relatively small quantity of water ejected from said nozzle 89. In the third or "Off" position, valve 82 has closed the casing 81 so that no water from conduit 80 can flow through it. In the fourth or "Dry" position, all of the water that enters the valve casing 81 through the inlet port passes at full pressure through conduit 88 and is ejected from high speed nozzle 89 against the impact wheel so as to rotate the latter at full speed.

Figure 1:
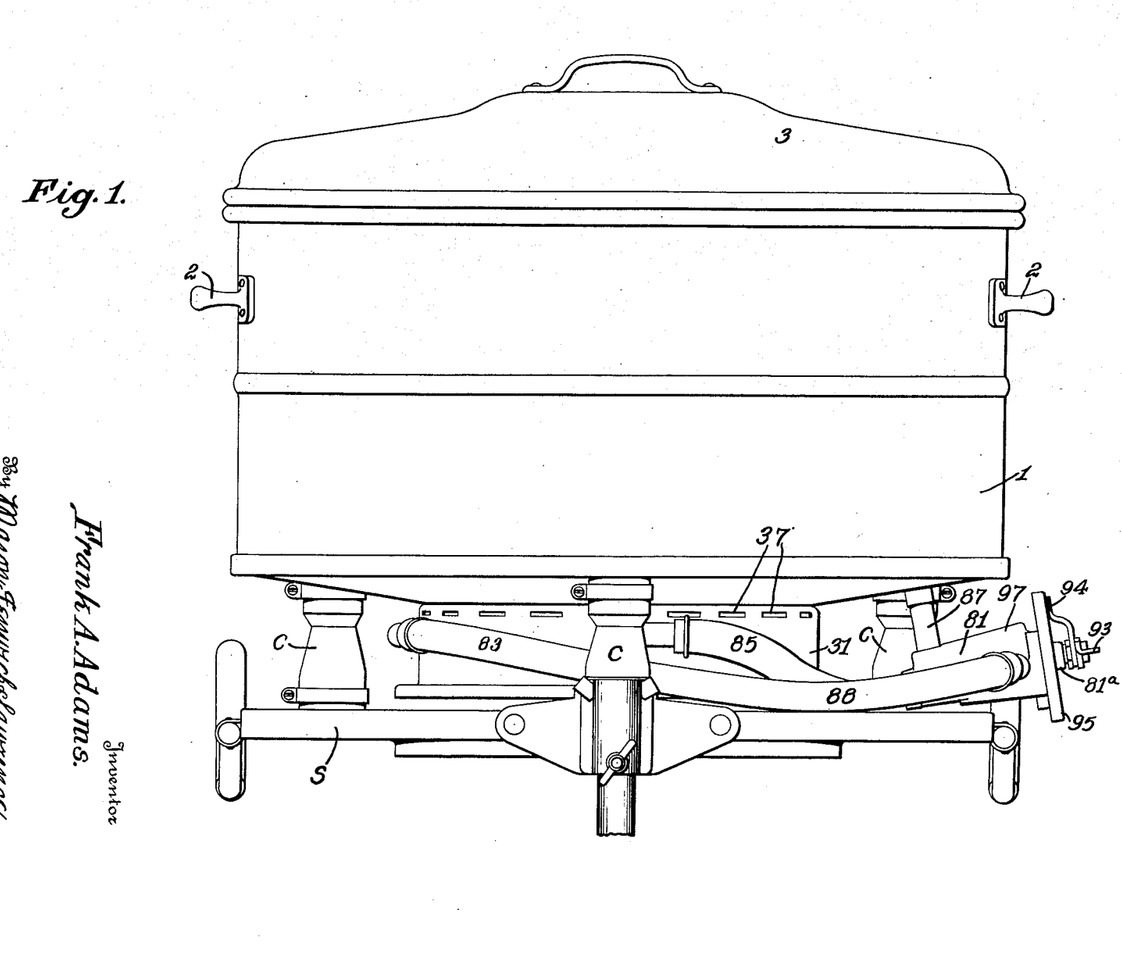
Figure 1 is an elevation of a machine embodying this invention.

The valve casing 81 has a conical bore 90 within which is fitted the correspondingly conical valve body 82 which has an axial stem 91 projecting from its larger end, said stem having a non round or flattened portion to receive an operating handle 92 whereby it may be rotated; and said stem is threaded at its extremity, as usual, for the purpose of receiving a nut to prevent endwise removal of the operating handle. The operating handle is indicated in Figs. 3 and 13 and consists of a transverse member having offset finger pieces 93 by which it may be manipulated. Fixedly connected with the valve stem and handle is a pointer 94 adapted to cooperate with the dial 95, which is secured to the larger end of the valve casing 81. The end of said valve casing is closed by the usual cap, having a gland 81ª through which passes the stem 91 of the valve body, said cap being secured to the casing in the present instance by screws or bolts entering suitable openings in the lugs 96 offset from the larger end of the casing, and the dial 95 is sleeved over the gland and bolted to the valve casing cap, the relative positions of the valve operating handle, pointer and dial, with respect to the casing being as shown in Figs. 1 and 3.

Figures 4, 5, 6, 7, 8, 18:
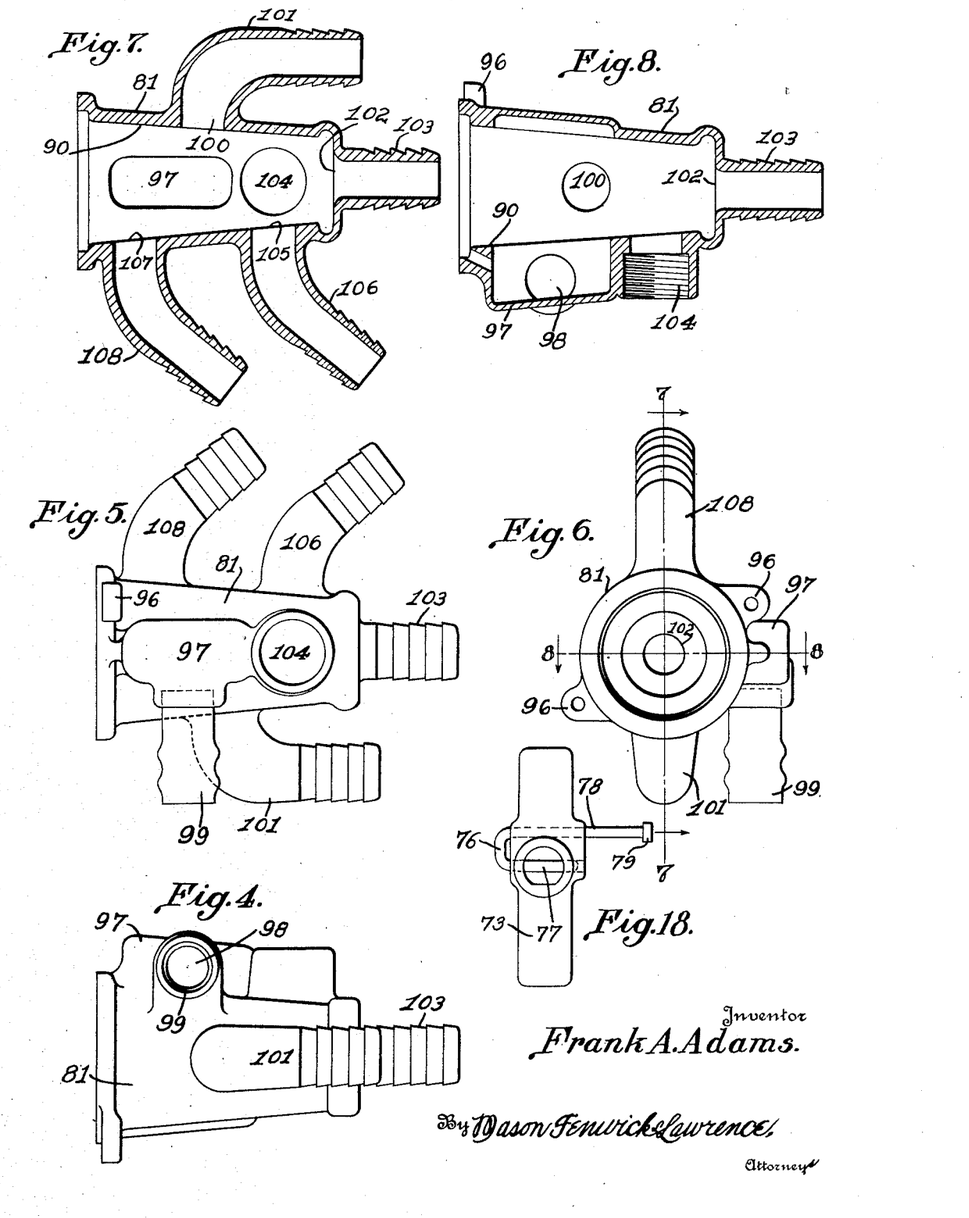
Figures 4, 5, 6, 7 and 8 are detail views of a valve casing forming a part of the controlling device.
Figure 18 is a detail of means for adjustably connecting an agitating device to a member for operating it.

As indicated in Figs. 3, and 4 to 8 inclusive, the valve casing 81 is provided with six ports. On the upper side of said valve casing in its normal position of use, as indicated in Figs. 3, 4, and 5, there is a manifold 97 provided at one side with an inlet port 98 into which is attached a nipple 99 for connection with a flexible hose constituting the conduit 80 which, as before stated, leads from a faucet or tap to conduct motive water to the motors. The port 100 which communicates with an integral curved hose connecting member 101 constitutes an outlet from the valve casing for water flowing into the conduit or pipe 83 to the valve casing 43 for actuating the agitator operating motor. Port 102 communicates with an integral hose connecting extension 103 to which is coupled the hose 84 that leads the exhaust water back into the valve casing 81. Port 104 connects with the rigid metallic pipe 87 for conducting rinse water into the receptacle 1. This port 104 is interiorly threaded for engagement with the threaded end of said metallic pipe and said pipe 87 also serves the purpose of supporting the valve casing 81 in proper position with respect to the machine. Port 105 communicates with a curved integral coupling member 106 to which is connected a section of hose 85 for conducting water to the low speed nozzle 86. Port 107 discharges through an integral coupling member 108 that is connected to a hose 88 for conducting water to the high speed nozzle 89 during the drying or extracting operation and also for conducting a small quantity of by-passed water thereto during the rinsing operation.

In Fig. 9, the valve body 82 is shown in position in the valve casing 81. Fig. 9 is a horizontal section, the valve and casing being viewed from beneath or in a position inverted from that illustrated in Fig. 5 and shows the valve in the position assumed by it when the pointer 94 is at "Wash" position, as indicated in Fig. 13. The valve body 82 is of hollow construction and is provided with an end chamber 109 divided from the remainder of the valve body by a partition 110. This end chamber 109 has an end port 111 and a side port 112. At the opposite end of the valve is a chamber 113 which is separated from the remainder of the valve by a partition 114, said chamber 113 communicating with the exterior by two ports 115 and 116 which are spaced circumferentially 90° apart. Between the end chambers described is a middle chamber 117 provided with three circumferential ports 118, 119 and 120 spaced 90° apart. The two ports 115 and 118 are disposed in axial alinement with each other. Ports 116 and 120 are also in axial alinement with each other, while ports 112 and 119 are in axial alinement with each other. In the position of the valve illustrated in Fig. 9, water flowing into port 98 flows from manifold 97 into port 118 in the middle chamber of the valve body and thence out through port 120 which is then in registration with the port 100 of the casing, so that water then flows through the hose conduit 83 into the valve casing 43 and actuates the agitator operating motor. With the valve 82 in the same position, the exhaust water returning through exhaust conduit 84 enters the port 102 of the valve casing, passes through port 111 of the valve body into chamber 109 and thence out through port 112 of said chamber, which at that time registers with the port 105 of the valve casing through which the water flows into hose conduit 85 which conducts it to the low speed nozzle 86 to operate the impact wheel slowly. With the valve in this position (the pointer 94 on "Wash") the agitator is operating within the slowly rotating perforated basket and the clothes are being washed, it being understood that at this time the receptacle is filled with hot soapy water.

After washing with soap and water has been completed, drainage valve 9 should be opened and the soiled and soapy water allowed to run off through the trough 15. Thereafter the valve having been turned to the next position, namely, the "Rinse" position, port 118 will have been moved into registration with port 100 which conducts water to conduit 83 leading to the agitator operating motor and port 119 will be opened to the chamber in the manifold 97. At this time also a groove 121 in the outer surface of the larger end of the valve body surrounding chamber 113 will establish communication between said manifold 97 and the port 107 which communicates with the high speed nozzle 89. At the same time port 112 leading from chamber 109 of the valve will be in registration with the port 104 which conducts rinse water into pipe 87 and through it into the receptacle 1.

Under this condition, therefore, water entering the manifold through the inlet port 70 flows in two branches, the main portion of the water passing from manifold through port 119 into chamber 117 and out through port 118 of said chamber which now registers with the outlet port 100 of the valve casing to supply water for operating the agitating motor, the exhaust from which is returned to the valve casing and directed through pipe 87 into the receptacle 1; and a small quantity of water is shunted from the manifold 97 through the shunt or bleeding passage 121 to port 107 into hose 88, whence it is discharged through the high speed nozzle 89 to operate the impact wheel slowly. At this time, therefore, water is flowing to the agitator operating motor, moving the agitator up and down, and the exhaust from that motor is flowing into the tub or receptacle 1 to supply rinse water for the clothing; and when the level of said rinse water has reached the level of overflow port 4 in the receptacle, the water passes therefrom through the downspout 5 into the trough 15 and out, the basket meanwhile rotating slowly due to the impact of a small quantity of water shunted from the manifold of the valve casing through the high speed nozzle to the impact wheel.

The next position indicated on the dial is the "Off" position. When the valve is rotated to bring the pointer to "Off" none of the ports in the valve body is in communication with the manifold 97; consequently no water enters the valve casing from the hose 80 which conducts water under pressure from the faucet.

The next or fourth position of the valve body 82, indicated by the pointer 94 at "Dry" on the dial, brings the port 116 in chamber 113 into registration with the manifold 97 and the port 115 into registration with the port 107 in the valve casing so that at this time water entering the manifold from the pipe 80 passes into chamber 113 through said port 116 and flows in full volume and under full pressure out through the port 115 into hose 88 to high speed nozzle 89 and rotates the impact water wheel at full speed, the agitator actuating motor being at this time cut off. When the valve is in the last position, it will be understood that all water has been drained from the receptacle 1 through the drainage valve 9 which has been locked in open position by the described valve actuator and the agitator preferably has been detached from the actuating rod 51.

The high speed rotation of the perforated basket removes the moisture from the clothes to the extent ordinarily accomplished by a wringing operation and puts them into condition to be hung on the line for air drying. After the controller pointer has been moved to the "Off" position, subsequent to the moisture extracting operation, it will be clear that by rotating handle 70 of the device shown in Fig. 16, the basket 22 may be detached from its connection to the driving member 57 and that the basket with the clothes therein may be lifted from the receptacle and carried to the clothes line, if desired.

The apparatus described is designed to be mounted with the trough 15 overhanging a sink so that the overflow water from the receptacle, the water drained therefrom and the exhaust from the motors will pass into said trough 15 and be discharged therefrom into the sink. In Figure 1 there is indicated a supporting stand to which are secured resilient columns $c$ to the upper ends of which in turn the receptacle 1 is secured. By this means the apparatus may be supported with the trough 15 overhanging the edge of the sink. Detailed description of any particular supporting means is not necessary for an understanding of the subject matter of this application.

The machine having been properly set up with the trough 15 over the edge of a sink, and the inlet end of hose 80 coupled to a water tap or faucet, the cover 3 may be removed, the agitating device 73, 74, 75 detached from the operating rod 51, and the clothing or other fabric articles to be washed deposited in the basket 22 and covered with warm soapy water. The agitator should then be again attached to the rod 51 at the height found to be best adapted to the quantity of clothing and the level of the wash water, so that the cups will rise clear of the water during their upward movement. At this point, the faucet should be opened and water admitted to valve casing 43, with the pointer 94 resting at "Wash" on the dial 95. The agitators then begin to move up and down and the basket 22 to rotate slowly. This operation continues until the articles are washed. Next, the valve 9 is opened and the soiled wash water drained from the receptacle 1. Valve 9 is then closed and the controller rotated until pointer 94 rests at the word "Rinse" on the dial. Now the agitator reciprocates as before and basket 22 again rotates slowly, while exhaust water from the agitator operating motor flows into receptacle 1, and after reaching the level of the port 4, overflows into trough 15. This operation may be continued until the articles are satisfactorily rinsed. When the rinsing action has been completed, the controller should be turned until the pointer 94 indicates "Off", when the motors stop. Valve 9 should then be opened and left locked in open position to draw the rinse water from the receptacle; and the agitator again be detached from the rod 51. After the rinse water has been drawn away, and the agitator removed, the controller should be turned until the pointer indicates "Dry" whereupon the basket starts to rotate and quickly reaches high speed causing the water adhering to and saturating the fabric articles to be forced outward through the perforations of the basket. After the moisture extracting operation is complete, the controller should be rotated until pointer indicates "Off" when the machine stops. The fabric articles may then be lifted from the basket, or the basket may be detached from the tubular driving shaft 57, and lifted with the articles in it from the receptacle 1.

Having described my invention, what I claim and desire to secure by Letters Patent is:—

1. The combination of a receptacle, a motor having a cylinder extending upward therein from the bottom, a piston rod extending from the cylinder, a perforated basket within the receptacle adapted to rotate about said cylinder, an agitator carried by the piston rod arranged to operate within the basket, a motor having a wheel for rotating the basket, a conduit for conducting fluid to the motors, and valve mechanism for controlling the supply of both motors.

2. The combination of a receptacle, a fluid actuated motor, an agitator operated thereby, a perforated basket in said receptacle within which said agitator operates, a fluid actuated motor for rotating the basket, means for conducting motive fluid to the agitator operating motor, and means for conducting the exhaust therefrom to the basket rotating motor to operate the latter.

3. The combination of a receptacle, a fluid actuated motor, an agitator operated thereby, a perforated basket in said receptacle within which said agitator operates, a fluid actuated motor for rotating said basket, means for conducting motive fluid to the agitator operating motor, and means for diverting a portion of said motive fluid flowing toward said agitator operating motor and conducting said diverted portion to the basket operating motor to operate the latter.

4. The combination of a receptacle, a water actuated motor, an agitator operated thereby, a perforated basket in said receptacle within which said agitator operates, a water actuated motor for rotating said basket, means for conducting motive water to the agitator operating motor, a conduit for leading the exhaust water from the agitator motor into the receptacle, and means for diverting a portion of the water flowing toward the agitator operating motor to the basket rotating motor to operate the latter slowly, said last mentioned means including suitable valve mechanism for controlling the flow of the motive water.

5. The combination of a receptacle, a water actuated motor, an agitator operated thereby, a perforated basket in said receptacle within which said agitator operates, a water wheel for rotating said basket, means for conducting water to the agitator operating motor, an exhaust conduit leading therefrom, a nozzle for directing, under one condition of operation, the exhaust water from the agitator motor against the water wheel, a second nozzle for directing, under another condition of operation, relatively high pressure water against the water wheel, and valve mechanism for controlling the flow of water to either of said nozzles at will during the continued operation of the agitator operating motor.

6. The combination of a receptacle, a water actuated motor, an agitator operated thereby, a perforated basket in said receptacle within which said agitator operates, a water wheel for rotating said basket, means for conducting water to the agitator operating motor, an exhaust conduit leading from the agitator operating motor, a nozzle for directing water against said water wheel, a valve casing connected with the exhaust conduit, conduits leading from said valve casing into said receptacle and to said nozzle, respectively, and a valve in said casing adapted in one position to connect the exhaust conduit with the receptacle and in another position to connect the exhaust conduit with said nozzle.

7. The combination of a receptacle, a water actuated motor, an agitator operated thereby, a perforated basket in said receptacle within which said agitator operates, a water wheel for rotating said basket, a valve casing, a supply conduit leading to said valve casing, a conduit for directing water from said valve casing to said agitator operating motor, a conduit leading from the latter to the valve casing, a conduit leading from the valve casing into said receptacle, a nozzle for directing water against the water wheel to rotate it, a conduit connecting said nozzle and the valve casing, and a valve within said casing adapted in one position to admit water to the agitator operating motor, admit the exhaust water from the agitator motor into the receptacle and divert a portion of the water entering the valve casing to said nozzle to rotate the water wheel.

8. The combination of a receptacle, a water actuated motor, an agitator operated thereby, a perforated basket in said receptacle within which said agitator operates, a water wheel for rotating said basket, a valve casing, a supply conduit for conducting water to the valve casing, a conduit for directing water from said valve casing to said agitator operating motor, an exhaust conduit leading from the agitator operating motor to the valve casing, a conduit leading from the valve casing into said receptacle, a nozzle adapted to direct water against said water wheel, a conduit connecting said nozzle to said valve casing, and a multiway valve in said valve casing adapted, when in one position, to direct water to the agitator operating motor and from the exhaust therefrom into the receptacle and to divert a portion of the water from the casing to the nozzle to operate the water wheel slowly and, when in another position, to cut off the water from the agitator operating motor and receptacle and direct a stream of full force through said nozzle to operate the water wheel at high speed.

9. The combination of a receptacle, a water actuated motor, an agitator operated thereby; a perforated basket in said receptacle within which said agitator operates, a water actuated motor for rotating said basket; a valve casing having inlet and outlet ports, suitable conduits connected therewith, a valve in said casing adapted to control the several ports so that in one position thereof water is conducted to the agitator operating motor and exhausted therefrom for washing purposes; in a second position water is conducted to the agitator operating motor and exhausted therefrom into the receptacle for rinsing purposes; in a third position motive water is cut off from the agitator operating motor and is directed to the basket operating motor to rotate the latter at high speed; and in a fourth position the motive water prevented from passing through.

10. The combination of a receptacle, a water actuated motor, an agitator operated thereby, a perforated basket in said receptacle within which said agitator operates, a motor wheel for rotating said basket, two nozzles adapted to direct water against said motor wheel; a valve casing having an inlet port, a port connected with said agitator operating motor to conduct water thereto, a port connected with the exhaust from said agitator operating motor; a port connected with the interior of the receptacle, and two ports connected with said nozzles; a valve within said casing having ports arranged in one position to direct water to the agitator operating motor and therefrom to one of said nozzles to rotate the water wheel slowly; in a second position to direct water to the agitator operating motor, therefrom into the receptacle, and also to divert a portion of the water from the valve casing to the other nozzle to operate the water wheel slowly; in a third position to shut off all water from the agitator operating motor and direct it through one of said nozzles to operate the motor wheel at high speed; and in a fourth position to shut off the water and prevent it from passing through said casing.

11. The combination of a receptacle, a perforated basket therein, an agitator, means for causing the agitator to operate upon the contents of the basket, means to rotate the basket, a conduit for conducting exhaust water from the agitator motor into the receptacle, and a controller valve adapted to be moved to different positions for controlling the operations of the agitator and basket operating means and the flow through the exhaust water conduit, whereby the contents of the basket may be washed, rinsed and dried by the manipulation of a single controller valve.

12. The combination of a receptacle, an agitator adapted to operate therein, a rod projecting upward within the receptacle, means for reciprocating said rod, means for detachably connecting the agitator to the upper portion of the rod, a rotary tubular shaft projecting upward through the bottom of the receptacle through which the rod reciprocates, means for rotating said tubular shaft, a perforated basket having a member extending upward from the bottom of the basket and surrounding said rotary tubular shaft, and a device at the top of said upward extending basket-attached member for connecting the latter with said rotary tubular shaft.

13. The combination of a receptacle, having a fluid tight tube rigid with and rising from the bottom of said receptacle, a rotary tubular driving shaft surrounded by said tube, a vertically reciprocatable rod operating within said tubular driving shaft, a perforated basket having a central member rising from its bottom, said basket having lateral bearing on the lower portion of said rigid tube, means for connecting the central member of the basket with said tubular driving shaft, and agitating means secured to said reciprocatable rod and arranged to operate in the basket.

14. The combination of a rotary member and a driven member detachably connected thereto, said rotary member having an open ended notch extending longitudinally thereof in its upper end, a circumferential shoulder thereon below said notch, and a groove intersecting said shoulder, a cap plate secured to said driven member, said cap plate having an opening therein adapted to engage over said rotary member and a tongue adapted to engage said notch, a locking plate secured to said cap plate in such manner as to be susceptible of angular movement thereon, said locking plate having a tongue adapted to enter said intersecting groove and engage beneath the shoulder.

15. The combination of a rotary member and a driven member detachably connected thereto, said rotary member having an open ended notch extending longitudinally thereof at its upper end, and a circumferential shoulder thereon below said notch, a groove intersecting said circumferential shoulder, a cap plate secured to said driven member and sleeved over the rotary member, said cap plate having an arcuate opening therein and having a tongue adapted to engage said notch, a locking plate having an opening adapted to fit over said driven member, and a tongue on said plate adapted to enter said intersecting groove and engage beneath the shoulder, a pin on the locking plate passing through said opening and an operating member exterior of the cap plate secured to said pin.

16. The combination of a receptacle, a rotary basket therein, a water motor below said receptacle for rotating said basket, a housing for said water motor secured to the bottom of the receptacle, and an insulating means between the housing and the receptacle, said insulating means comprising an air chamber betweeen the housing and the bottom of the receptacle, said air chamber having spaced openings in its perimeter providing for circulation of air.

17. In mechanism of the class described, a reciprocating rod having a plurality of transverse holes, a detachable member having an opening adapted to be sleeved over the rod, said detachable member having a hole adapted to register with one of said holes in the reciprocating rod and a second hole parallel to the first named hole therein at one side of said opening, and a U-shaped locking member having its respective arms slidable in the holes of said detachable member.

In testimony whereof I affix my signature.

FRANK A. ADAMS.